Dec. 23, 1958 — O. MUSGRAVE — 2,865,159
RIDING LAWN MOWER
Filed Sept. 21, 1955 — 2 Sheets-Sheet 1
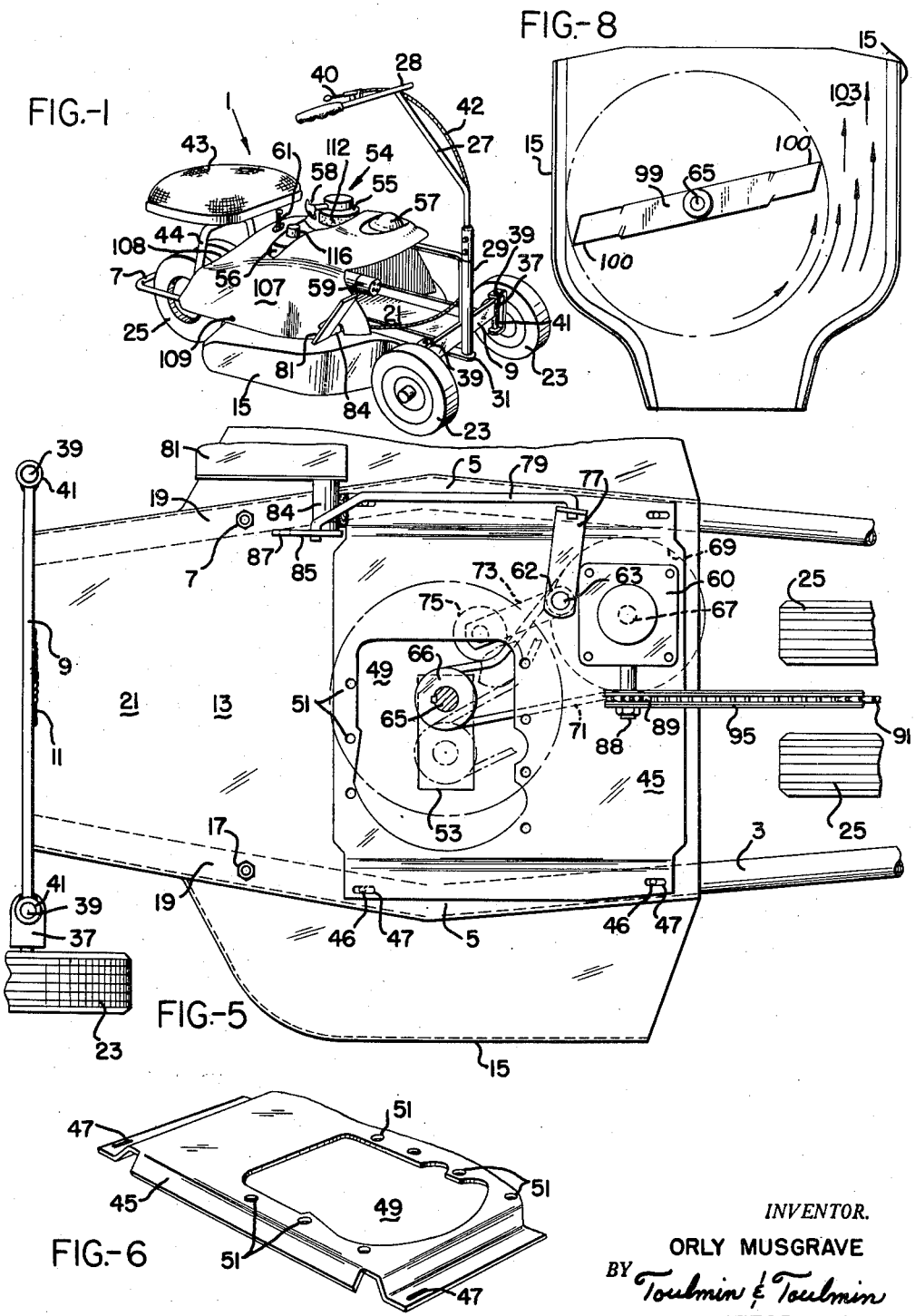
INVENTOR.
ORLY MUSGRAVE
BY Toulmin & Toulmin
ATTORNEYS Dec. 23, 1958 — O. MUSGRAVE — 2,865,159
RIDING LAWN MOWER
Filed Sept. 21, 1955 — 2 Sheets-Sheet 2
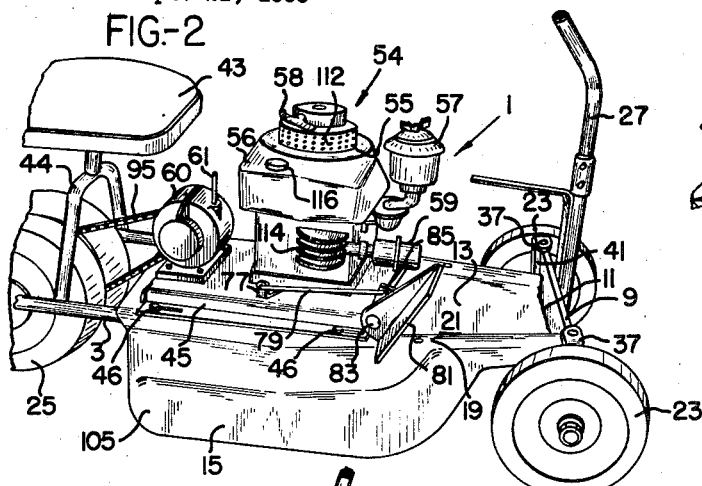
INVENTOR.
ORLY MUSGRAVE
BY Toulmin & Toulmin
ATTORNEYS United States Patent Office 2,865,159
Patented Dec. 23, 1958

2,865,159
RIDING LAWN MOWER
Orly Musgrave, Springfield, Ohio

Application September 21, 1955, Serial No. 535,553

7 Claims. (Cl. 56—25.4)

This invention relates to mowers and particularly to rider guided power lawn mowers having rotary cutter-blade means.

The invention particularly contemplates the provision of a lawn mower having superior cutting capabilities, high stability and which is subject to being produced at a minimum of expense. I have found that such a lawn mower, in the rider controlled or guided units, for example, may be achieved by suitably positioning the power source of the mower well rearwardly on the mower frame but forwardly of the seat and rear wheels; for optimum efficiency the motor is then directly connected to the cutter blade means.

A particular feature of the invention is the arrangement of the cutter blade means on the frame in such manner that the cut material forms readily in a windrow at one side of the mower.

A primary object of the invention is to provide in a power lawn mower a novel structural arrangement for effectively utilizing in the power lawn mower rotary cutter means the length of which is readily selected in accordance with the nature and condition of the material to be cut. It will be understood that when grass is relatively high and thick that somewhat greater torque will be required by the cutter blade; also some kinds of grass are less readily cut through than others and will require greater torque on the blade to produce the cutting action.

Another important object of the invention is to provide a rider-controlled powered lawn mower in which discomfiture to an operator occasioned by the proximity of the power source to the seat is substantially completely avoided and the rider is protected from fumes, dust and cuttings frequently associated with the mowing operation.

The invention will be more fully understood by reference to the following detailed description and accompanying drawings wherein:

Figure 1 is a perspective view of a preferred embodiment of the mower of invention taken from the right hand side and forwardly of the mower and showing a protective hood over the power source;

Figure 2 is an enlarged right side elevational view of the mower of Figure 1 with the protective hood removed;

Figure 3 is an enlarged left side elevational view of the mower of Figure 1 with the protective hood removed;

Figure 4 is a fragmentary bottom view of the mower of Figures 1–3, inclusive;

Figure 5 is an enlarged fragmentary plan view of the mower of Figures 1–4, inclusive, illustrating somewhat schematically the relative positioning of the power source assembly and transmission mechanism to the rear wheels;

Figure 6 is a fragmentary view of a plate for the mounting of the power source adjustably;

Figure 7 is a reduced fragmentary view corresponding to that of the structure of Figure 5;

Figure 8 is a schematic view illustrating the manner in which a windrow is formed; and Figure 9 is an enlarged fragmentary view illustrating a portion of the structure of Figure 7.

In the drawings similar numerals designate corresponding parts.

Referring to the drawings and initially particularly Figures 1–4, inclusive, the numeral 1 generally designates a preferred embodiment of the mower of invention. A frame work or frame assembly is provided and constitutes a tubular frame 3 of somewhat U-shape, widened slightly at 5 (Figures 4 and 5) and closed by an integral portion 7 at it's rearward end; this frame is closed forwardly by a laterally extending rigid cross-bar 9 which is suitably secured to the ends of the frame 3. The frame receives thereacross a rigid base plate member 13 of sheet-metal which has integral therewith foot-receiving wings 15 which extend downwardly rearwardly. The plate is secured to the tubular frame member laterally by suitable bolt and nut assemblies 17 (Figure 4) which engage the plate member 13 at upturned portions 19. The plate member 13 is depressed and underslung between wings 15 and accordingly the central portion 21 of the plate member depends below the tubular frame 3; this assists materially in the attainment of a low center of gravity in the mower. Forwardly the underslung portion is suitably welded at 11 to cross-bar 9.

The framework thus described is supported by relatively small forward wheels 23 suitably about 8" in diameter, and by slightly larger closely spaced rear wheels 25. Steering post 27, to the upper end of which is connected handle means 28, is rotatably mounted through a vertically extending sleeve 29 welded to cross-bar 9 and is secured to and connected by link 31 with yoke 32 and tie rods 33; tie rods 33 are each secured to links as at 35, which links 35 are secured to fork members 37 which carry the wheels 23. Pintles 39 are carried in tubular members 41 which are welded to opposed ends of cross-bar 9 and the pintles have the fork members 37 secured thereon. A throttle control lever 40 is suitably connected to the power source by cable 42 and is retained on the handle means for convenient power source control. Any other suitable steering means may be employed in the practice of the invention.

Suitably welded to frame 3 rearwardly and extending transversely thereof is at 44 a vertically extending substantially U-shaped tubular member having seat 43 conveniently mounted thereon.

Referring now particularly to Figures 2, 3 and 5 there is provided, extending transversely of plate member 13 and spanning the rearward underslung portion thereof a rigid, supporting cross-beam 45 which mounts thereon a gas engine power source assembly and transmission mechanism; the cross-beam is relatively narrow, extending forwardly on the plate member 13 well short of the length of the plate member. The cross-beam is secured to the plate member 13 in any suitable manner as by sheet metal screws 46. Most suitably slots 47 are provided in the cross-beam to permit of adjustment of the cross-beam longitudinally on the plate member 13 and frame 3.

The cross-beam 45 is provided with a large cut-out portion 49 somewhat forwardly and left of center of the beam; the beam is also conveniently provided with a plurality of apertures 51 for the reception of lugs for securing a gas engine to the beam.

Plate member 13 in a portion thereof below the cut-out portion 49 of beam 45 is provided with a laterally extending opening 53.

The cross-beam 45 as shown in Figures 2 and 3 has mounted thereon a power source comprising a gasoline engine assembly indicated generally at 54 and suitably including a gasoline engine 55, a fuel tank 56, an air cleaner 57 for the air to the engine, a recoil starter handle 58 for the engine, and an exhaust pipe 59. The cross-beam also mounts power transmission mechanism including the gear box 60 having the shift lever 61; a vertical housing 62 suitably welded to the cross-beam and extending thereabove and therebelow retains sleeve bearing 63 (Figure 9).

The engine shaft 65 passes through cut-out portion 49 and the opening 53 of the plate member 13 and carries a V-belt pulley 66 on the portion of the shaft extending vertically between the cross-beam and plate member; the drive shaft 67 of gear box 60 likewise extends vertically downwardly into the spacing 68 between the cross-beam and plate member and carries a somewhat larger V-belt pulley 69. Drive V-belt 71 is loosely trained over these latter two pulleys in the idling condition of the mower.

Sleeve bearing 63 carries fixedly at its lower end a link 73 the opposed end of which is provided with an idler pulley 75 for contact with the outer flat surface of the belt 71 for tensioning the same. The upper end of sleeve bearing 63 has fixedly secured thereto an angle link 77 the upstanding portion of which receives therethrough an end of a clutch rod 79.

A foot pedal 81 is mounted on rock shaft 83 which fixedly carries a clutch plate 85 on its inner end; rock shaft 83 is rotatably mounted in tubular housing 84 which is welded to the cross-beam at a corner thereof; the clutch plate is provided with a plurality of apertures 87 for receiving the clutch 79 in different degrees of adjustment of beam 45. Depression of foot pedal 81 causes engagement of idler pulley 75 with belt 71 to tension the same for transmitting drive power to the gear box.

Extending substantially horizontally from the gear box 60 is the driven shaft 88 thereof which carries a sprocket 89. Sprocket 91 carried between the rear wheels on tubular housing 93 is connected operably with sprocket 89 by chain 95 for transmission of power to the rear wheels (Figures 3 and 5).

The rear wheels are themselves carried on tubular housing 93 (Figure 3) which is rotatably mounted on the stationary transverse shafting 96 which is itself supported from frame 3 by collars 97 welded to the frame on opposite sides thereof. Sleeve bearings at 98 provide for rotation of the housing on the shafting when chain 95 is operated.

Referring now particularly to Figure 5 the gas engine shaft 65 and the pulley 66 thereon are indicated in both solid and dot-dash lines to illustrate the adjustability of the positioning of the gas engine and its shaft. This adjustability provides that a cutter blade 99 of suitable length may be carried by the lower end of the shaft (Figure 4) in such manner that its cutting extremities 100 will closely approach the outer depending portion 101 of the left-hand foot-receiving wing 15 of the mower; thus this lateral left-hand edge of the mower forms a guide edge 102 for permitting trimming close to bushes, trees, etc.

As shown in Figure 5 in solid lines shaft 65 is positioned substantially centrally of the mower and is adapted to receive the longest cutter blade, usually about 24" diameter in present practice.

I prefer however to employ the engine-shaft carried blade as shown in Figure 4 and as illustrated in dotted lines in Figure 5. When so utilized the engine shaft and blade center are left of center of the mower, the cutting extremity 100 of the blade approaches the guide edge 102 of the depending portion 101 and the right hand side of the mower provides a channel 103 (Figure 4) between the depending portion 105 of the right-hand foot-receiving wing and the right hand extension of the cutter blade. With clockwise rotation of the cutter blade as viewed by a rider on the seat and indicated by the curved arrow in Figure 4 the material cut by the blade in its rotation will be carried in the direction of the rectilineal arrow (Figure 4) rearwardly of the mower to provide a windrow over which the closely spaced rear wheels do not pass.

The width of the frame may of course be selected to provide a channel as 103 when employing any desired length of blade. I have found that a blade length of about 20" is suitable as illustrated in Figure 4.

The combination of the channel 103 with the cutter blade directly mounted on the engine shaft provide a startling cutter capacity which is most important in connection with the rider mowers described since for reasons of economy the engine size is usually limited to 2½ to 3 horsepower.

To accomplish the movement of the engine and its shaft and the securing of the same readily the motor base is suitably provided with circular flange 106, schematically illustrated in Figure 3; the flange is conveniently provided with a plurality of apertures, preferably four in number, which coincide with apertures in cross-beam 45. Suitably the cross-beam has seven apertures as indicated and bolts retain the engine in either of two desired positions of adjustment laterally of the mower. If desired additional positions may be provided for by simply supplying additional mating apertures.

Referring now to Figure 1 an open-ended hood 107 is shown as extending over the engine, the fuel tank, exhaust pipe and gear box as well as the cross-beam. This hood performs a plurality of functions including those of protecting the rider from the heat of the engine, the fumes from the exhaust, and also of protecting the engine itself from dirt and dust. The hood is open at the front, as suitably is the spacing 68 (Figure 3), and a free flow of air in operation of the mower courses under the hood over the engine and the transmission equipment, maintaining the same cooled and at the same time drawing fumes from the exhaust rearwardly beneath the hood and out the rearward open end thereof at 108. The hood is suitably secured through plate member 13 to the tubular frame 3 by screws as at 109. Also the hood is suitably apertured in its upper side to expose the starter handle, the fuel tank and air cleaner.

The cross-beam 45 at its rearward edge is preferably provided with a depending flange 110, which very nearly, but does not completely close the spacing between the beam and the plate member rearwardly. This flange 110 serves to prevent the entry of cut material to the belt, but at the same time air may flow from the forward end over the belt and out past the flange 110.

The unit of invention is very low slung due to the welding of plate member 13 to the base of the forward cross-bar; the cutting blade is preferably 1¾" to 2½" above the ground level for adequate mowing of lawns and the seat is suitably about 18 inches above the ground at its uppermost side.

The speed of the cutter blade is dependent upon engine speed and with standard commercially available engines the R. P. M. may be as high as 3600.

It will be noted that the gasoline engine assembly 54 is positioned rearwardly of the lateral center and preferably to some extent laterally of the longitudinal center of the mower and is thus very close to the seat; in fact the upwarly extending engine and starter thereon is readily reached from the seat by a rider of the mower.

The hood of vapor impermeable, dust impermeable material, extending transversely of the mower, protects the rider from heat of the engine and from exhaust fumes. This arrangement places the weight of the unit rearwardly permitting a very low slung mower and provides a free space forwardly on the base plate member.

The engine is not only cooled by the air of the cool air inlet 112 which passes inwardly of the engine casing to the cooling fins 114 but is cooled by the air coursing through hood 107. Suitably the cooling air inlet 112 and the fuel tank cap 116 extend through hood 107 as does shift lever 61.

It will be further noted that removal of the cross-beam 45 from the frame assembly effects removal of the engine, fuel tank, gear box and major components of the transmission, including the foot pedal 81. This is a material aid in servicing as the whole assembly is readily replaceable without loss of time, it only being required to make routine disconnections of the chain 95, the blade 99, and the holding means constituted by nuts and bolts referred to hereinbefore.

The riding device described and as shown in Figure 1 has particular utility also as a conveyance for example, the structure because of its low slung nature is employable on factory and farming grounds, railroad yards, and so forth.

It will be understood that this invention is susceptible to modification in order to adapt it to different usages and conditions and accordingly, it is desirable to comprehend such modifications within this invention as may fall within the scope of the appended claims.

I claim:

1. In a riding lawn mower, a frame, wheel means supporting the frame forwardly and rearwardly, a seat on the frame rearwardly but forwardly of the rearward wheel means, a steering post having handle means thereon, the steering post extending upwardly from a forward part of the frame bent rearwardly and terminating in the handle means, the handle means being within reach of a rider on the seat, a base plate member extending forwardly on the frame below the seat and handle means, a cross-beam of lesser length than the base plate member forwardly of and below the seat spanning the base plate member, secured thereon and defining with the member a vertical spacing, said beam being removable from the member, a gasoline engine on the cross-beam having an output shaft which depends through openings in the cross-beam and said member, a rotatable cutting blade on the shaft below the member, power transmission means within the spacing, a gear box supported upwardly on the cross-beam and having a shaft extending into the spacing, said power transmission means operatively connecting the output shaft of the gasoline engine with the shaft of the gear box, means operatively connecting the gear box to the rearward wheel means for the transmission of power from the engine to the rearward wheel means, a removable hood extending over the engine and cross-beam forwardly of and below the seat arranged for protecting a rider from the engine, the heat of the engine and dust and cuttings occasioned by the rotation of the cutting blade, said hood having openings forwardly and rearwardly for the passage of air along the member longitudinally over and under the engine and gear box in movement of the mower.

2. In a riding lawn mower: a frame extending lengthwise of the mower, forward and rearward wheel means of the mower supporting the frame, a seat on the frame rearwardly but forward of the rear wheel means, a steering post having handle means thereon, the steering post extending upwardly from a forward part of the frame bent rearwardly and terminating in the handle means, the handle means being within reach of a rider on the seat, a base plate member extending forwardly on the frame below the seat and handle means and having on each lateral side of the mower a foot-receiving wing which extends laterally of the mower beyond the frame, a said foot-receiving wing having a depending outer edge portion forming with the foot-receiving portion of the wing a guide edge visible to an operator on the seat for guiding the mower, a cross-beam of lesser length than the base plate member extending cross-wise of the mower on the base plate and frame and terminating short of the foot-receiving wing portion defining with the base plate member a vertical spacing, said cross-beam having a laterally extending cut-out portion, a gasoline engine on the cross-beam positioned over said cut-out portion and having an output shaft which depends through said cut-out portion, said spacing and a laterally extending opening of the base plate member to provide for movement of the engine laterally on the cross-beam, means to secure the engine on the cross-beam in a laterally adjusted position, a cutter-blade secured on the output shaft of the engine below the base plate member and mounted for rotation with the output shaft, said blade having a lesser length than the width of the mower including the foot-receiving wings and extending substantially horizontally beneath the base plate member whereby the cutter-blade mounted on the output shaft of said engine may be arranged by positioning the engine to have the blade extremities rotate contiguous to said depending outer edge portion and to said guide edge so that an operator on said seat may guide the cutting by said blade by viewing said guide edge.

3. A riding lawn mower as in claim 2, and wherein each foot-receiving wing has a depending portion, the engine is secured on the cross-beam laterally of the longitudinal centerline of the mower and the blade extremities are arranged for rotation contiguous to one said depending portion and the guide edge, the other said depending portion opposite the guide edge forming with the cutter blade a channel therebetween and beneath the foot-receiving wing portion for the passage along the channel of material cut by the mower in the rotation of the blade, the rear wheel means of said mower being a pair of closely spaced rear wheels mounted within the width of the frame and positioned such that cut material passing along the channel rearwardly of the mower passes laterally outwardly of the rear wheels.

4. In a riding lawn mower: an elongated frame, forward and rearward supporting wheel means on the frame, a seat on the frame, a steering post having handle means thereon, the steering post extending upwardly from a forward part of the frame, extending rearwardly and terminating in handle means, a base plate member on the frame and having on each lateral side of the mower a foot-receiving wing which extends laterally of the mower beyond the frame, said foot-receiving wings having depending outer edge portions forming with the foot-receiving portions of the wings guide edges, a cross-beam motor support on the base plate, said cross-beam having a cut-out portion, a source of power on the cross-beam positioned over said cut-out portion and having an output shaft which depends through said cut-out portion and said base plate member, securing means interconnecting said base plate member, said cross-beam and said frame, a cutter-blade secured on the output shaft of the source of power below the base plate member, said blade having a lesser length than the width of the mower including the foot-receiving wings and extending substantially horizontally beneath the base plate member.

5. A riding lawn mower as claimed in claim 4, in which the said source of power on the cross-beam motor support is a gasoline engine and which mower has hood portions extending upwardly from the base plate member on opposite sides of the engine for protecting a rider from the engine laterally.

6. A riding lawn mower as claimed in claim 4, in which said cross-beam motor support and said base plate member define a vertical spacing and in which mower said source of power on the said cross-beam motor support is a gasoline engine and which cross-beam also has a gear box mounted thereon, said gear box having a shaft extending into the said spacing, said mower having power transmission means within the said vertical spacing operatively connecting the output shaft of the gasoline engine with the shaft of the gear box.

7. A riding lawn mower as claimed in claim 4, in which the said source of power on the cross-beam motor support is a gasoline engine and which cross-beam motor support also supports a gear box, and power transmission means operatively connecting the gasoline engine with the gear box, the wheel means of the mower being operatively connected with the gear box, and said cross-beam being adjustable longitudinally of the frame.

References Cited in the file of this patent

UNITED STATES PATENTS

| | | |
|---|---|---|
| 1,748,745 | Zukerman | Feb. 25, 1930 |
| 2,210,217 | Rahn | Aug. 6, 1940 |
| 2,523,640 | Zipf | Sept. 26, 1950 |
| 2,559,897 | Phelps | July 10, 1951 |
| 2,620,612 | De Eugenio | Dec. 9, 1952 |
| 2,659,445 | Church | Nov. 17, 1953 |
| 2,691,263 | Wegele | Oct. 12, 1954 |
| 2,705,393 | Cofer | Apr. 5, 1955 |
| 2,734,325 | La Bonte | Feb. 14, 1956 |
| 2,746,445 | Cocklin | May 22, 1956 |
| 2,748,553 | Funk | June 5, 1956 |